United States Patent
Jiang

(10) Patent No.: US 12,520,432 B2
(45) Date of Patent: Jan. 6, 2026

(54) AUTOMATIC PROCESSING METHOD FOR PRINTED CIRCUIT BOARD DATA AND ELECTRONIC DEVICE

(71) Applicant: IsCoolLab Co., Ltd., Taipei (TW)

(72) Inventor: Yan-Mei Jiang, Taipei (TW)

(73) Assignee: IsCoolLab Co., Ltd., Taipei (TW)

( * ) Notice: Subject to any disclaimer, the term of this patent is extended or adjusted under 35 U.S.C. 154(b) by 671 days.

(21) Appl. No.: 17/957,634

(22) Filed: Sep. 30, 2022

(65) Prior Publication Data

US 2024/0114624 A1 Apr. 4, 2024

(51) Int. Cl.
*H05K 3/22* (2006.01)
*G06T 7/00* (2017.01)
*H05K 3/00* (2006.01)
*H05K 3/02* (2006.01)

(52) U.S. Cl.
CPC .......... *H05K 3/0005* (2013.01); *G06T 7/001* (2013.01); *H05K 3/025* (2013.01); *G06T 2207/30141* (2013.01); *H05K 2203/03* (2013.01)

(58) Field of Classification Search
CPC .. H05K 3/0005; H05K 3/025; H05K 2203/03; H05K 3/225; G06T 7/001; G06T 2207/30141
See application file for complete search history.

(56) References Cited

U.S. PATENT DOCUMENTS

| | | | | |
|---|---|---|---|---|
| 8,612,923 | B2 * | 12/2013 | Arora | G06F 30/39 715/764 |
| 10,503,862 | B1 * | 12/2019 | Ghosh | G06F 30/394 |
| 2009/0034833 | A1 * | 2/2009 | Ozaki | G03F 9/7088 382/149 |

FOREIGN PATENT DOCUMENTS

CN 109241017 A 1/2019

* cited by examiner

*Primary Examiner* — Nghia M Doan
(74) *Attorney, Agent, or Firm* — Li & Cai Intellectual Property (USA) Office

(57) ABSTRACT

An automatic processing method for printed circuit board data and an electronic device are provided. The automatic processing method for printed circuit board data includes steps as follows: capturing a first image information on a display device by using an image information capturing circuit, in which the first image information includes one or more first operation area image information; and moving an indicator to one side of the one or more first operation area image information by using the indicator control circuit for performing a first operation action, until each of the one or more first operation area image information has the corresponding first operation action performed thereon. The first operation area image information includes two copper foils. The two copper foils have a gap therebetween. The first operation action is a copper scraping action.

8 Claims, 6 Drawing Sheets

AUTOMATIC PROCESSING METHOD FOR PRINTED CIRCUIT BOARD DATA AND ELECTRONIC DEVICE

FIELD OF THE DISCLOSURE

The present disclosure relates to an automatic processing method for printed circuit board data and electronic device, and more particularly to an automatic processing method for printed circuit board data and electronic device having low cost.

BACKGROUND OF THE DISCLOSURE

Currently, automation solutions for printed circuit board data that are commercially available mainly includes using a printed circuit board data processing software to independently perform the automation program, or using another automation software to communicate with the printed circuit board data processing software and to share data and internal instructions. However, the abovementioned two solutions involve complicated automation construction processes and higher construction costs therefor.

SUMMARY OF THE DISCLOSURE

In response to the above-referenced technical inadequacies, the present disclosure provides an automatic processing method for printed circuit board data and an electronic device.

In one aspect, the present disclosure provides an automatic processing method for printed circuit board data. The automatic processing method for printed circuit board data is adapted for an electronic device. The electronic device is connected to a display device. The electronic device includes a controller, an image information capturing circuit, an indicator control circuit, and a storage circuit. The image information capturing circuit is connected to the controller. The indicator control circuit is connected to the controller. The storage circuit is connected to the controller. The automatic processing method for printed circuit board data includes steps as follows: capturing a first image information on a display device by the image information capturing circuit, and the first image information includes one or more first operation area image information; and moving an indicator to one side of one or more first operation area image information by the indicator control circuit to perform a first operation action, until each of the one or more first operation area images is performed by the corresponding first operation action. The first operation area image information includes two copper foils. The two copper foils have a gap therebetween. The first operation action is a copper scraping action.

In another aspect, the present disclosure provides an electronic device. The electronic device for executing an automation program is connected to a display device. The electronic device includes a controller, an image information capturing circuit, an indicator control circuit, and a storage circuit. The controller is connected to the display device. The image information capturing circuit is connected to the controller. The indicator control circuit is connected to the controller. The storage circuit is connected to the controller. The storage circuit stores a printed circuit board data. The printed circuit board data is displayed on the display device. The image information capturing circuit captures a first image information of the printed circuit board data displayed on the display device. The controller recognizes one or more first operation area image information of the first image information. The controller uses the indicator control circuit to move an indicator to one side of the one or more first operation area image information to perform a first operation action. The first operation action is a copper scraping action. The first operation area image information at least includes two copper foils. The two copper foils have a gap therebetween, and the gap is less than a predetermined distance. The controller executes the first operation action to scrape a part of the copper foils of the two copper foils, so that the gap between the two copper foils of one of the one or more first operation area image information is larger or equal to the predetermined distance.

Therefore, in the automatic processing method for printed circuit board data and the electronic device provided by the present disclosure, the automatic processing method for printed circuit board data and the electronic device provided by the present disclosure can be not in communication with the software for processing printed circuit boards by using internal data, and can achieve an automation program by simulating actions of a user. The automatic processing method for printed circuit board data and the electronic device provided in the present disclosure can effectively reduce the cost of automation construction and improve a processing efficiency.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
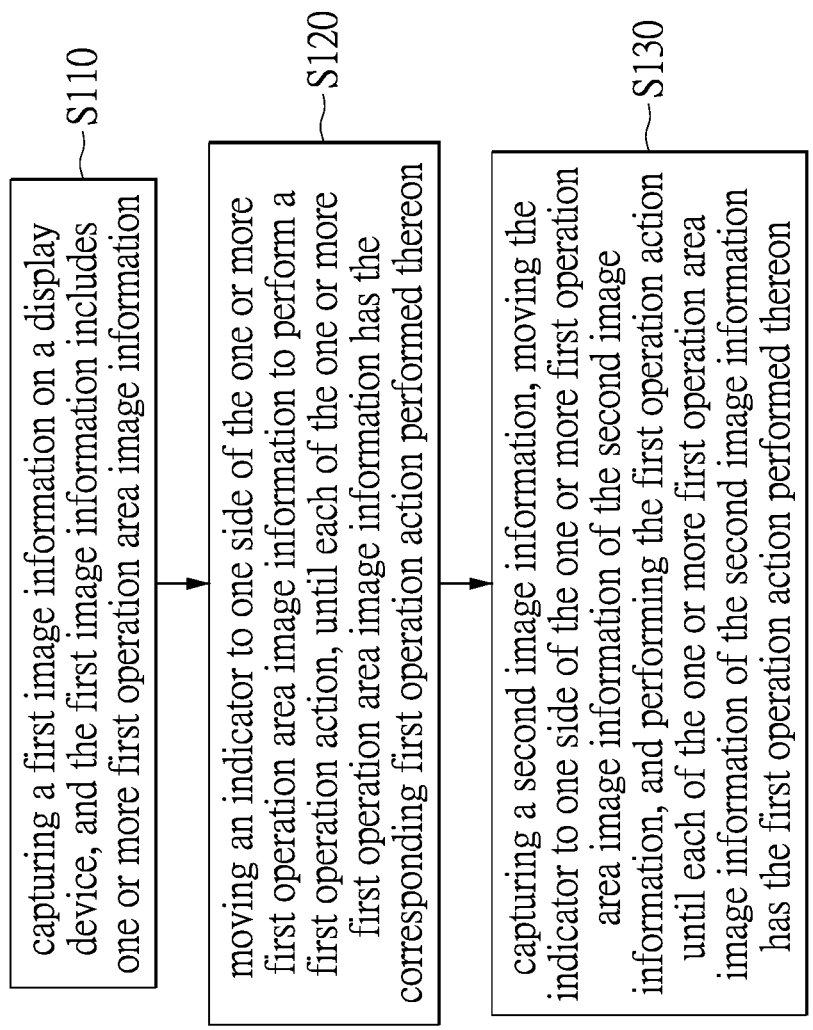
FIG. 1 is a flowchart of an automatic processing method for printed circuit board data according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
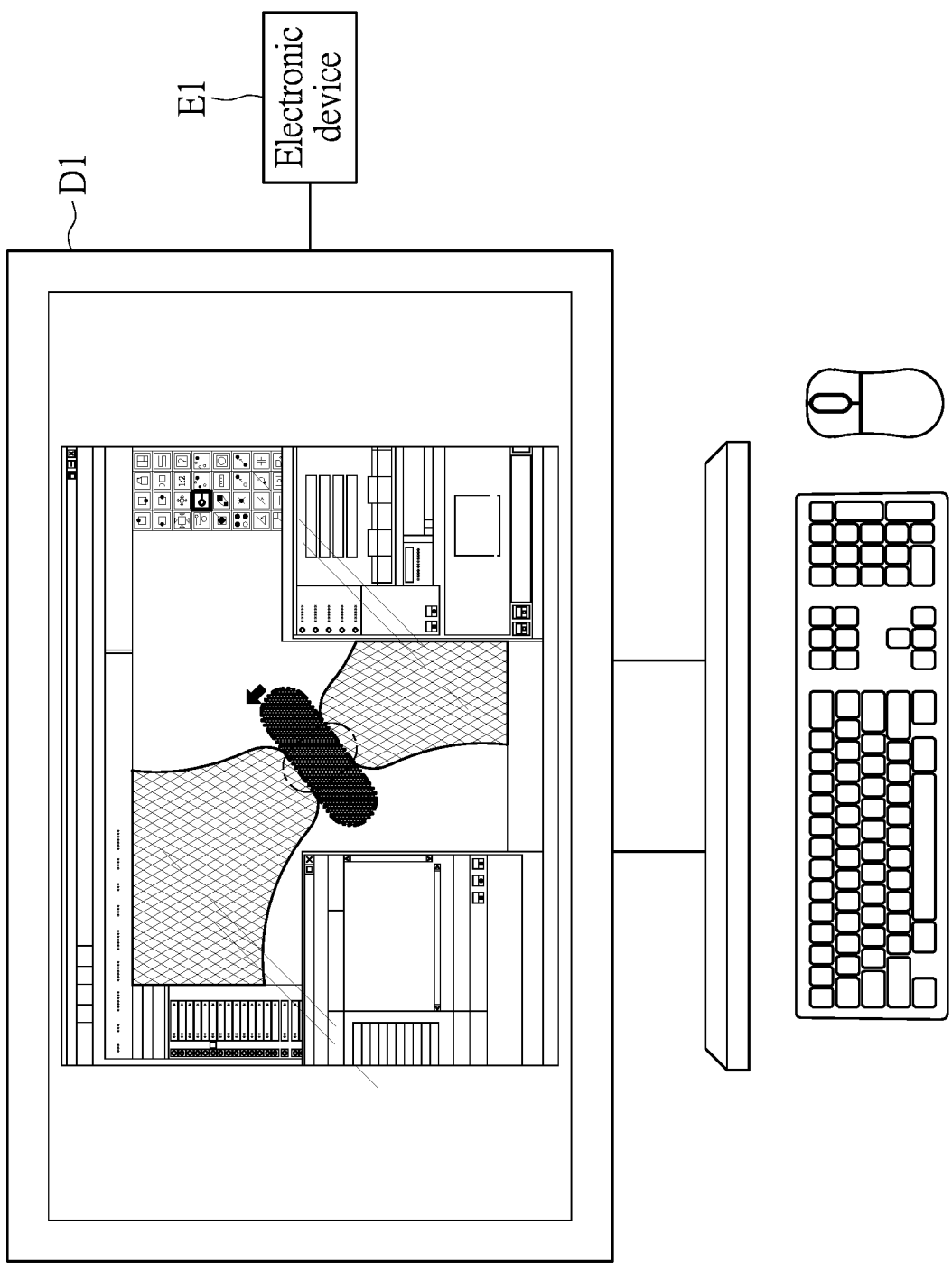
FIG. 2 is a schematic diagram of a usage scenario of the automatic processing method for printed circuit board data according to the first embodiment of the present disclosure.
Figure 3:
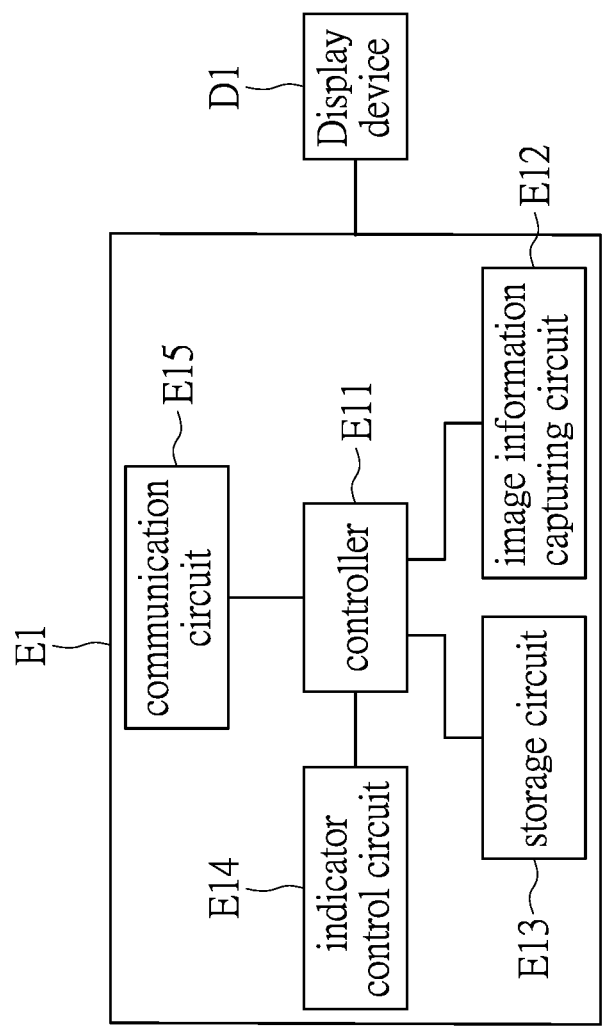
FIG. 3 is a functional block diagram of an electronic device cooperating with a display device according to the first embodiment and a second embodiment of the present disclosure.
Figure 4:
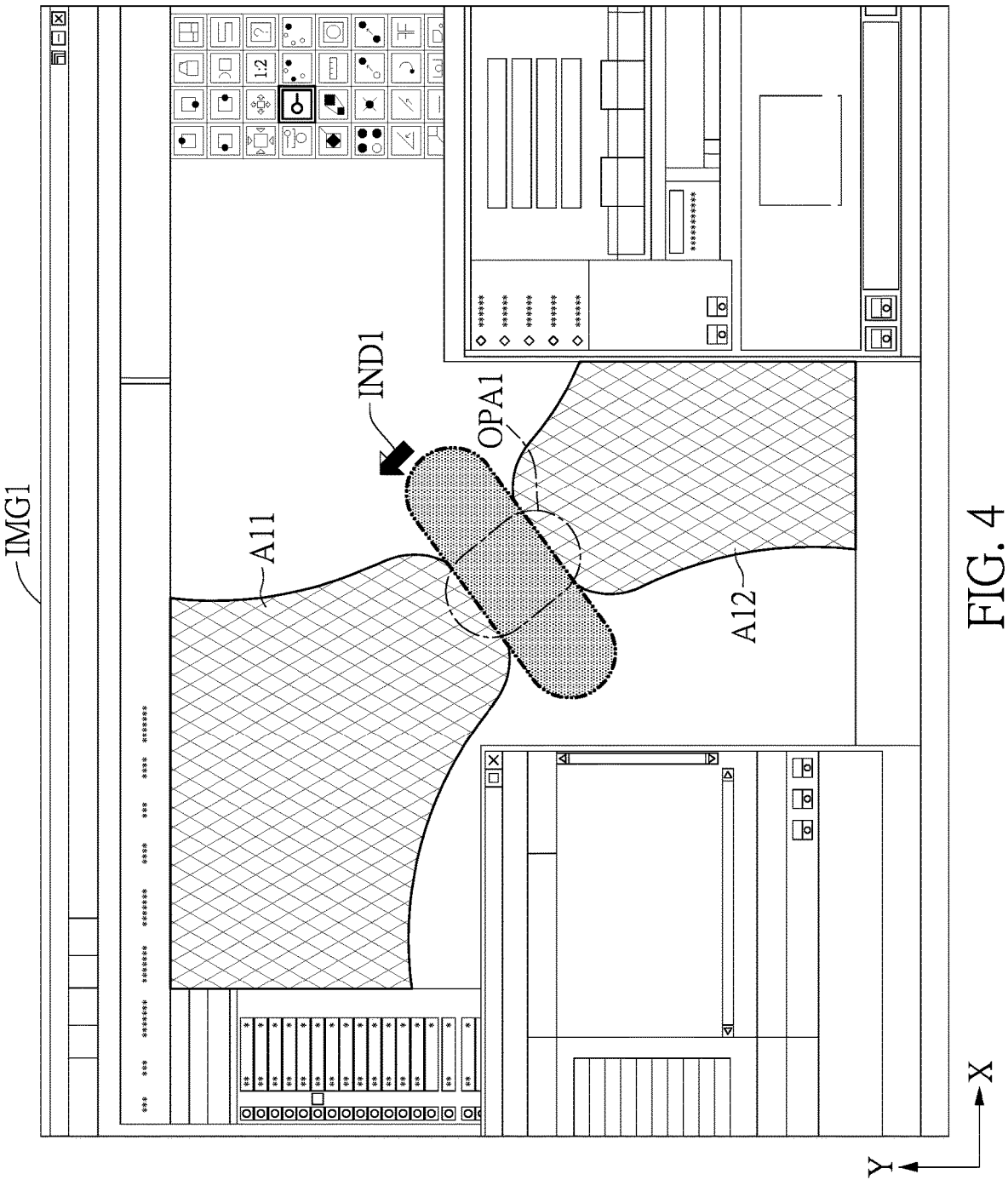
FIG. 4 is a schematic diagram of first image information captured by the automatic processing method for printed circuit board data according to the first embodiment of the present disclosure.
Figure 5:
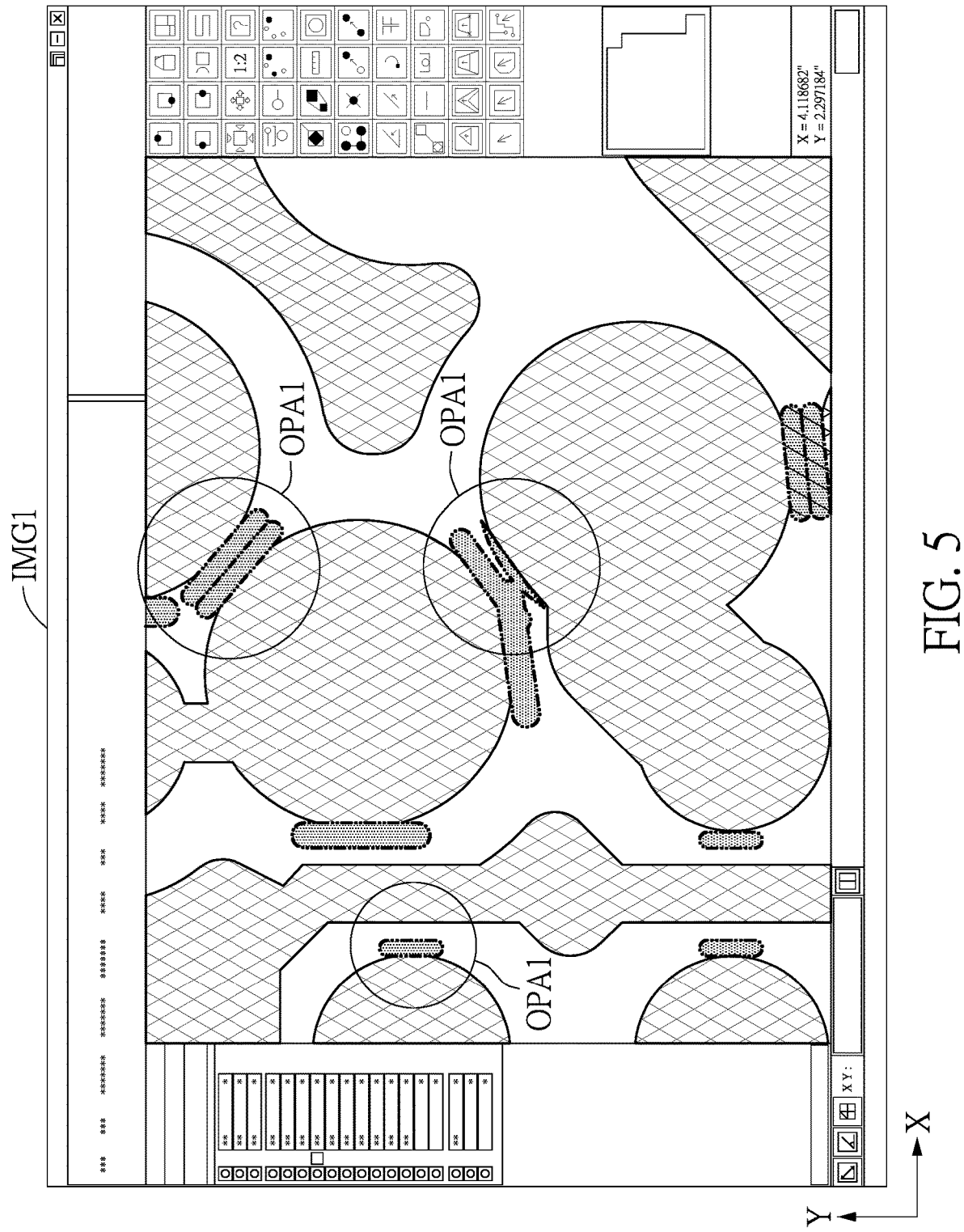
FIG. 5 is another schematic diagram of the first image information captured by the automatic processing method for printed circuit board data according to the first embodiment of the present disclosure.

Reference is made to FIG. 1, FIG. 2, FIG. 3, FIG. 4, and FIG. 5. FIG. 1 is a flowchart of an automatic processing method for printed circuit board data according to a first embodiment of the present disclosure. FIG. 2 is a schematic diagram of a usage scenario of the automatic processing method for printed circuit board data according to the first embodiment of the present disclosure. FIG. 3 is a functional block diagram of an electronic device cooperating with a display device according to the first embodiment and a second embodiment of the present disclosure. FIG. 4 is a schematic diagram of first image information captured by the automatic processing method for printed circuit board data according to the first embodiment of the present disclosure. FIG. 5 is another schematic diagram of the first image information captured by the automatic processing method for printed circuit board data according to the first embodiment of the present disclosure.

In this embodiment, an automatic processing method for printed circuit board data is provided, and the automatic processing method is adapted to an electronic device E1. The automatic processing method for printed circuit board data includes steps as follows:

Step S110: capturing a first image information on a display device, and the first image information includes one or more first operation area image information;

Step S120: moving an indicator to one side of the one or more first operation area image information to perform a first operation action, until each of the one or more first operation area image information has the corresponding first operation action performed thereon; and Step S130: capturing a second image information, moving the indicator to one side of the one or more first operation area image information of the second image information, and performing the first operation action until each of the one or more first operation area image information of the second image information has the first operation action performed thereon.

In step S110, the first operation area image information at least includes two copper foils, and the two copper foils have a gap therebetween. The gap between the two copper foils is less than a predetermined distance. Furthermore, the first operation action is a copper scraping action.

In other words, in the automatic processing method for printed circuit board data in this embodiment, a first image information displayed on a display device D1 is firstly captured. The first image information is captured from a printed circuit board data. When the printed circuit board data is displayed on the display device D1, the printed circuit board data can be enlarged and displayed in a predetermined display ratio. One of the one or more first operation area image information is then configured in a central area of the display device D1. Then, the first image information having at least one first operation area image information is captured.

In this embodiment, an electronic device E1 may be an electronic device that includes the display device D1, and may be a desktop computer, a laptop computer, a tablet computer, or a smartphone.

The electronic device E1 may also be a server, which is connected to a local display device or a remote display device to execute the automatic processing method for printed circuit board data in this embodiment.

In this embodiment, the electronic device E1 in FIG. 2 is exemplarily a desktop computer. The electronic device E1 at least includes a controller E11, an image information capturing circuit E12, a storage circuit E13, an indicator control circuit E14, and a communication circuit E15.

Reference is made to FIG. 4, the storage circuit E13 stores at least one printed circuit board data. The controller E11 can display the printed circuit board data on the display device D1. Then, the controller E11 controls an indicator IND1 by using the indicator control circuit E14 to perform movements of different regions or actions of various operations, such as the first operation action or other operation actions. In this embodiment, the automatic processing method for printed circuit board data does not necessarily perform deep communication with printed circuit board data processing software. In the automatic processing method for printed circuit board data, the controller E11 uses the indicator (i.e., performing an operation process such as using a mouse or a keyboard) to replace action of an actual user for executing a normal processing manner of the printed circuit board data processing software through first image information IMG1. Instead of communicating with the underlying data, the controller E11 directly uses general instructions of the printed circuit board data processing software to perform control and operation.

In step S120, the first operation action is a copper scraping action. That is, a part of the two copper foils A11 and A12 on both sides of the gap is removed, so that the gap between the two copper foils A11 and A12 is greater than or equal to a predetermined distance. On the other hand, only a part of the copper foil on one side of the gap is scraped off, so that the gap between the two copper foils is greater than or equal to the predetermined distance. The predetermined distance can be preset.

The first image information IMG1 may include one or more first operation area image information OPA1, and the first image information IMG1 may include a plurality of the first operation area image information OPAL The first operation action corresponding to the first operation area image information OPA1 can be performed so that the copper scraping action is performed for the gap between the two copper foils in each of the first operation area image information OPA1, such that each of the gaps is larger than or equal to the predetermined distance.

In this step, the controller E11 moves the indicator IND1 to one side of the first operation area image information OPA1 to perform the first operation action. In this embodiment, the indicator IND1 is the cursor symbol of the mouse, and the first operation action is a copper scraping action performed by a dragging action of the mouse. In other embodiments, the indicator IND1 may be an indicator of a keyboard, a mouse, a stylus, or other peripheral devices. In other embodiments, an operation mode of the indicator IND1 may include clicking of the mouse, a combination of pressing left and right buttons of the mouse (e.g., pressing the right button to expand a menu, and pressing the left button to select a specific item), using the mouse or stylus to draw various shapes, or an operation of hot keys of the keyboard.

In step S130, after processing one or more first operation area image information in the first image information, the next step is to process the first operation area image information of other areas in the first image information.

In this embodiment, referring to FIG. 5, the first operation area image information OPA1 is an operation area that includes at least a gap between two copper foils smaller than the predetermined distance. Therefore, among the different image information that are captured, the first operation area image information OPA1 that includes at least the gap between the two copper foils and smaller than the predetermined distance should be found. FIG. 5 shows a plurality of the first image operation area image information OPA1 that require the copper scraping action. The controller E11 can enlarge the image information so that only one of the first operation area image information OPA1 is displayed on the display device D1.

That is, in step S130, the second image information and the first image information IMG1 are similar to each other. The second image information also includes one or more first operation area image information, so that the controller E11 moves the indicator IND1 in the second image information that is captured to one side of one of the first operation area image information of the second image information to perform the first operation action (i.e., copper scraping operation), until all of one or more of the first operation area image information in the second image information have the first operation action performed thereon.

In this embodiment, a first coordinate system may be obtained by calculating the first image information. Since the one or more first operation area image information is recognized from the first image information, the one or more first operation area image information may respectively include a coordinate value based on the first coordinate system of the first image information. The indicator is moved to a location around each of the coordinate values of the one or more first operation area image information. In this embodiment, the coordinate value of each of the first operation area image information may be a small range of coordinate values. Therefore, the indicator IND1 can be moved to a corner around the coordinate value of the first operation area image information, so as to perform the first operation action (the copper scraping action).

Figure 6:
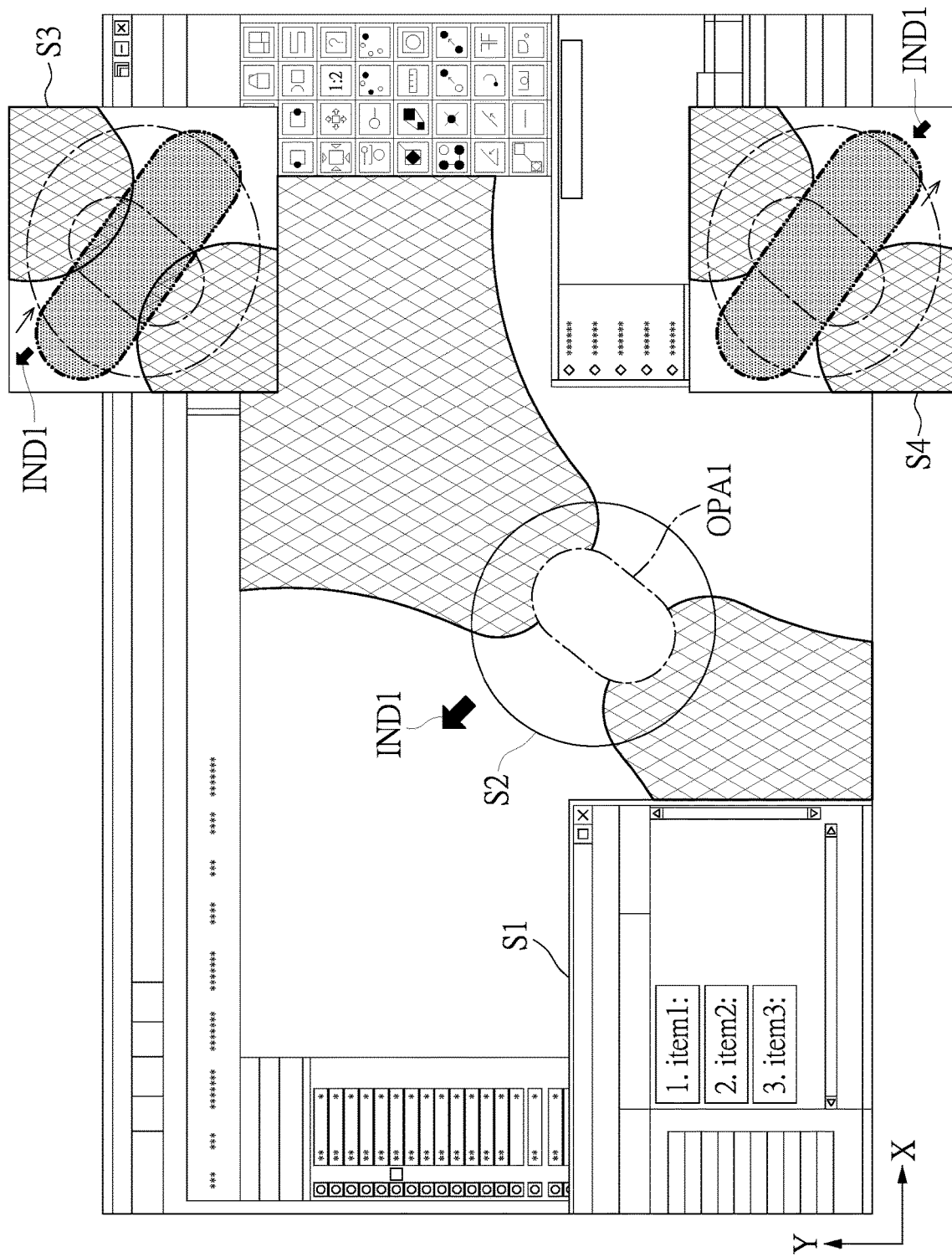
FIG. 6 is a schematic diagram of the flowchart of FIG. 1.

Reference is made to FIG. 6, and FIG. 6 is a schematic diagram of the flowchart of FIG. 1. In FIG. 6, according to the above steps, the controller E11 of the electronic device E1 can select one of the items to check a problem (step S1). Then, the controller E11 displays an enlarged design drawing of the problem in the center of the display screen, the problem exemplarily being that two sides in the first operation area image information OPA 1 are too close to each other (step S2). Afterwards, the first operation action (the copper scraping action) is used for processing, and the indicator (a mouse cursor) is dragged from the upper left to the lower right of the first operation area image information OPA1 (step S3). A final screen displays that the copper foils on the two sides in the first operation area image information OPA1 of the first operation area have been successfully removed (step S4).

In this embodiment, the actions operated by the controller E11 are trained through machine learning, or a preset operation mode.

Second Embodiment

Reference is made to FIG. 3, in this embodiment, an electronic device E1 for executing an automation program is provided. The electronic device E1 at least includes a controller E11, an image information capturing circuit E12, a storage circuit E13, an indicator control circuit E14, and a communication circuit E15. The electronic device E1 is connected to a display device D1. The storage circuit E13 stores a printed circuit board data. The printed circuit board data is displayed on the display device D1.

In this embodiment, the electronic device E1 is an electronic device, a virtual device, or a cloud service program that can execute the automatic processing method of the first embodiment.

The image information capturing circuit E12 captures a first image information of the printed circuit board data displayed on the display device D1. The controller E11 recognizes one or more first operation area image information in the first image information. The controller E11 uses the indicator control circuit E14 to move an indicator to one side of one of the first operation area image information, and performs a first operation action. In other embodiments, the operation mode of the indicator may also include clicking of the mouse, a combination of pressing left and right buttons of the mouse (e.g., pressing the right button to expand a menu, and pressing the left button to select a specific item), using the mouse or stylus to draw various shapes, or an operation of hot keys of the keyboard.

In addition, in this embodiment, the display device D1 can be connected to the controller E11 via a wired communication or a wireless communication. That is, the display device D1 may be a remote display, which is connected to the controller E11 via a wireless network. The controller E11 transmits the first image information to the display device D1 through the network. Similarly, the indicator control circuit E14 can also be connected to the controller E11 via a wireless communication or a wired communication.

Beneficial Effects of the Embodiments

In conclusion, in the automatic processing method for printed circuit board data and the electronic device provided by the present disclosure, the automatic processing method for printed circuit board data and the electronic device provided by the present disclosure can be not in communication with the software for processing printed circuit boards by using internal data, and can achieve an automation program by simulating actions of a user. The automatic processing method for printed circuit board data and the electronic device provided in the present disclosure can effectively reduce the cost of automation construction and improve a processing efficiency.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An automatic processing method for printed circuit board data, being adapted for an electronic device, the electronic device being connected to a display device, the electronic device including a controller, an image information capturing circuit, an indicator control circuit, and a storage circuit, wherein the image information capturing circuit is connected to the controller, the indicator control circuit is connected to the controller, and the storage circuit is connected to the controller, a printed circuit board data is displayed by the controller on the display device, each of the distances between two copper foils of the printed circuit board data is calculated by the controller, and the locations of the distance between two copper foils that is less than the predetermined distance can be shown by the controller on the display device, the automatic processing method comprising:

capturing a first image information of the printed circuit board data on the display device by using the image information capturing circuit, the first image information including one or more first operation area image information;

moving an indicator, the indicator control circuit is used by controller, to one side of the one or more first operation area image information by using the indicator control circuit to perform a first operation action, until each of the one or more first operation area image information has the corresponding first operation action performed thereon;

wherein the first operation area image information includes two copper foils, and the two copper foils have a gap therebetween, the gap between the two copper foils of the first operation area image information is needed to be greater than or equal to a predetermined distance, when the gap between the two copper foils of the first operation area image information is less than the predetermined, the first operation action is performed, the predetermined distance between the two copper foils is configured for meeting distance requirements of a standard for the printed circuit board;

wherein the first operation action is a copper scraping action;

wherein the controller obtains a first coordinate system based on the first image information, the controller obtains the one or more first operation area image information from the first image information and respectively calculates a coordinate value for the one or more first operation area image information, and the controller uses the indicator control circuit to move the indicator to a location around each of the coordinate values of the one or more first operation area image information.

2. The automatic processing method according to claim 1, further comprising:

capturing a second image information, moving the indicator to one side of the one or more first operation area image information of the second image information, and performing the first operation action until each of the one or more first operation area image information of the second image information has the first operation action performed thereon.

3. The automatic processing method according to claim 1, wherein the electronic device is a server, a desktop computer, a laptop computer, a tablet computer, or a smartphone, wherein the storage circuit stores the printed circuit board data, the printed circuit board data is displayed on the display device, and the controller recognizes the one or more first operation area image information of the first image information, wherein the controller obtains the first coordinate system based on the first image information, and the controller obtains the one or more first operation area image information from the first image information.

4. The automatic processing method according to claim 3, wherein the electronic device further includes a communication circuit, the communication circuit is connected to the controller, and the controller is electrically connected to the display device through the communication circuit.

5. The automatic processing method according to claim 4, wherein the display device is a remote display device, and the controller is connected to the display device via a wired communication or a wireless communication.

6. An electronic device for executing an automation program, wherein the electronic device is connected to a display device, and the electronic device comprises:

a controller connected to the display device;

an image information capturing circuit connected to the controller;

an indicator control circuit connected to the controller; and a storage circuit connected to the controller, wherein the storage circuit stores a printed circuit board data, and the printed circuit board data is displayed by the controller on the display device, each of the distances between two copper foils of the printed circuit board data is calculated by the controller, and the locations of the distance between two copper foils that is less than a predetermined distance can be showed by the controller on the display device;

wherein the image information capturing circuit captures a first image information of the printed circuit board data displayed on the display device, and the controller recognizes one or more first operation area image information of the first image information;

wherein the controller uses the indicator control circuit to move an indicator to one side of the one or more first operation area image information to perform a first operation action;

wherein the first operation action is a copper scraping action, the first operation area image information at least includes two copper foils that have a gap therebetween, and the gap is less than the predetermined distance, wherein the controller executes the first operation action to scrape off a part of each of the two copper foils, so that the gap between the two copper foils of one of the one or more first operation area image information is larger than or equal to the predetermined distance, the predetermined distance between the two copper foils is configured for meeting distance requirements of a standard for the printed circuit board.

7. The electronic device according to claim 6, wherein the controller obtains a first coordinate system based on the first image information, the controller obtains the one or more first operation area image information from the first image information and respectively calculates a coordinate value for the one or more first operation area image information, and the controller uses the indicator control circuit to move the indicator to a location around each of the coordinate values of the one or more first operation area image information.

8. The electronic device according to claim 7, further comprising a communication circuit, wherein the communication circuit is electrically connected to the controller, and the controller is connected to the display device via a wired communication or a wireless communication.

\* \* \* \* \*